United States Patent
Shimizu et al.

(10) Patent No.: US 9,582,950 B2
(45) Date of Patent: Feb. 28, 2017

(54) WIRELESS CHARGING SYSTEM WITH LOCATION VERIFICATION

(71) Applicant: TOYOTA JIDOSHA KABUSHIKI KAISHA, Toyota-shi, Aichi-ken (JP)

(72) Inventors: Takayuki Shimizu, Mountain View, CA (US); Akihisa Yokoyama, Cupertino, CA (US); Atsushi Kawakubo, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 117 days.

(21) Appl. No.: 13/850,114

(22) Filed: Mar. 25, 2013

(65) Prior Publication Data

US 2014/0285317 A1    Sep. 25, 2014

(51) Int. Cl.
| | |
|---|---|
| H04B 7/24 | (2006.01) |
| G07C 9/00 | (2006.01) |
| H02J 7/02 | (2016.01) |
| G07C 5/00 | (2006.01) |

(52) U.S. Cl.
CPC .......... *G07C 9/00111* (2013.01); *H02J 7/025* (2013.01); *G07C 5/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,449,181 | A * | 9/1995 | Miyaoh | 277/595 |
| 6,574,603 | B1 * | 6/2003 | Dickson | G07C 5/0858 235/381 |
| 8,823,551 | B1 * | 9/2014 | Hoffman | B60L 11/182 340/932.2 |
| 2011/0221387 | A1 * | 9/2011 | Steigerwald | B60L 11/182 320/108 |
| 2013/0029595 | A1 * | 1/2013 | Widmer | H04B 5/0031 455/39 |

(Continued)

OTHER PUBLICATIONS

Halevi, Tzipora et al., "Secure Proximity Detection for NFC Devices based on Ambient Sensor Data," Proceedings of the 17th European Symposium on Research in Computer Security, Sep. 10-12, 2012, pp. 379-396, vol. 7459, Pisa, Italy.

*Primary Examiner* — Brian Zimmerman
*Assistant Examiner* — Cal Eustaquio
(74) *Attorney, Agent, or Firm* — Patent Law Works LLP

(57) ABSTRACT

The disclosure includes a system and method for charging a target object wirelessly. The system includes a processor and a memory storing instructions that when executed cause the system to: receive data describing a code from a target object, the code being stored on a tagging device and configured to be read wirelessly by a reading device associated with the target object; verify the code; determine that a location associated with the target object satisfies a safe charging range responsive to the verification of the code, the verification of the code indicating a charging distance between a power transmitter and a power receiver associated with the target object satisfies a safe charging distance; and instruct the power transmitter to wirelessly transmit power to the power receiver associated with the target object responsive to determining that the location of the target object satisfies the safe charging range.

20 Claims, 7 Drawing Sheets

(56) References Cited

U.S. PATENT DOCUMENTS

2013/0049683 A1* 2/2013 Farkas .......................... 320/108
2014/0340191 A1* 11/2014 Clark .................. G07F 17/0092
                                                      340/5.2

* cited by examiner

WIRELESS CHARGING SYSTEM WITH LOCATION VERIFICATION

BACKGROUND

The specification relates to a wireless charging system.

A power receiver may receive power wirelessly from a power transmitter. However, if the power receiver is located too far away from the power transmitter, it may not be safe and feasible for the power transmitter to transmit power wirelessly to the power receiver.

SUMMARY

According to one innovative aspect of the subject matter described in this disclosure, a system for charging a target object wirelessly includes a processor and a memory storing instructions that, when executed, cause the system to: receive data describing a code from a target object, the code being stored on a tagging device and configured to be read wirelessly by a reading device associated with the target object; verify the code; determine that a location associated with the target object satisfies a safe charging range responsive to the verification of the code, the verification of the code indicating a charging distance between a power transmitter and a power receiver associated with the target object satisfies a safe charging distance; and instruct the power transmitter to wirelessly transmit power to the power receiver associated with the target object responsive to determining that the location of the target object satisfies the safe charging range.

In general, another innovative aspect of the subject matter described in this disclosure may be embodied in methods that include: receiving data describing a code from a target object, the code being stored on a tagging device and configured to be read wirelessly by a reading device associated with the target object; verifying the code; determining that a location associated with the target object satisfies a safe charging range responsive to the verification of the code, the verification of the code indicating a charging distance between a power transmitter and a power receiver associated with the target object satisfies a safe charging distance; and instructing the power transmitter to wirelessly transmit power to the power receiver associated with the target object responsive to determining that the location of the target object satisfies the safe charging range.

Other aspects include corresponding methods, systems, apparatus, and computer program products for these and other innovative aspects.

These and other implementations may each optionally include one or more of the following features. For instance, the features include: the safe charging range being a maximal range within which the target object is positioned and configured to be charged wirelessly by the power transmitter; the reading device being a radio frequency identification reader and the tagging device being a radio frequency identification tag; the reading device being a near field communication reader and the tagging device being a near field communication tag; the reading device being configured to be positioned within a first distance from the power receiver and the tagging device being configured to be positioned within a second distance from the power transmitter; the reading device being attached to the power receiver and the tagging device being attached to the power transmitter; retrieving verification data from a storage device; determining whether the code matches the verification data; and confirming the verification of the code responsive to determining that the code matches the verification data.

The present disclosure may be particularly advantageous in a number of respects. For example, the system utilizes a short communication range of radio frequency identification (RFID) communication or near field communication (NFC) to verify that a location of a target object to be charged by a power transmitter satisfies a safe charging range. Responsive to the verification that the target object is located within the safe charging range, the power transmitter can transmit power wirelessly to a power receiver associated with the target object. For example, the power transmitter can charge the target object wirelessly if a charging distance between the power transmitter and the power receiver satisfies a safe charging distance.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
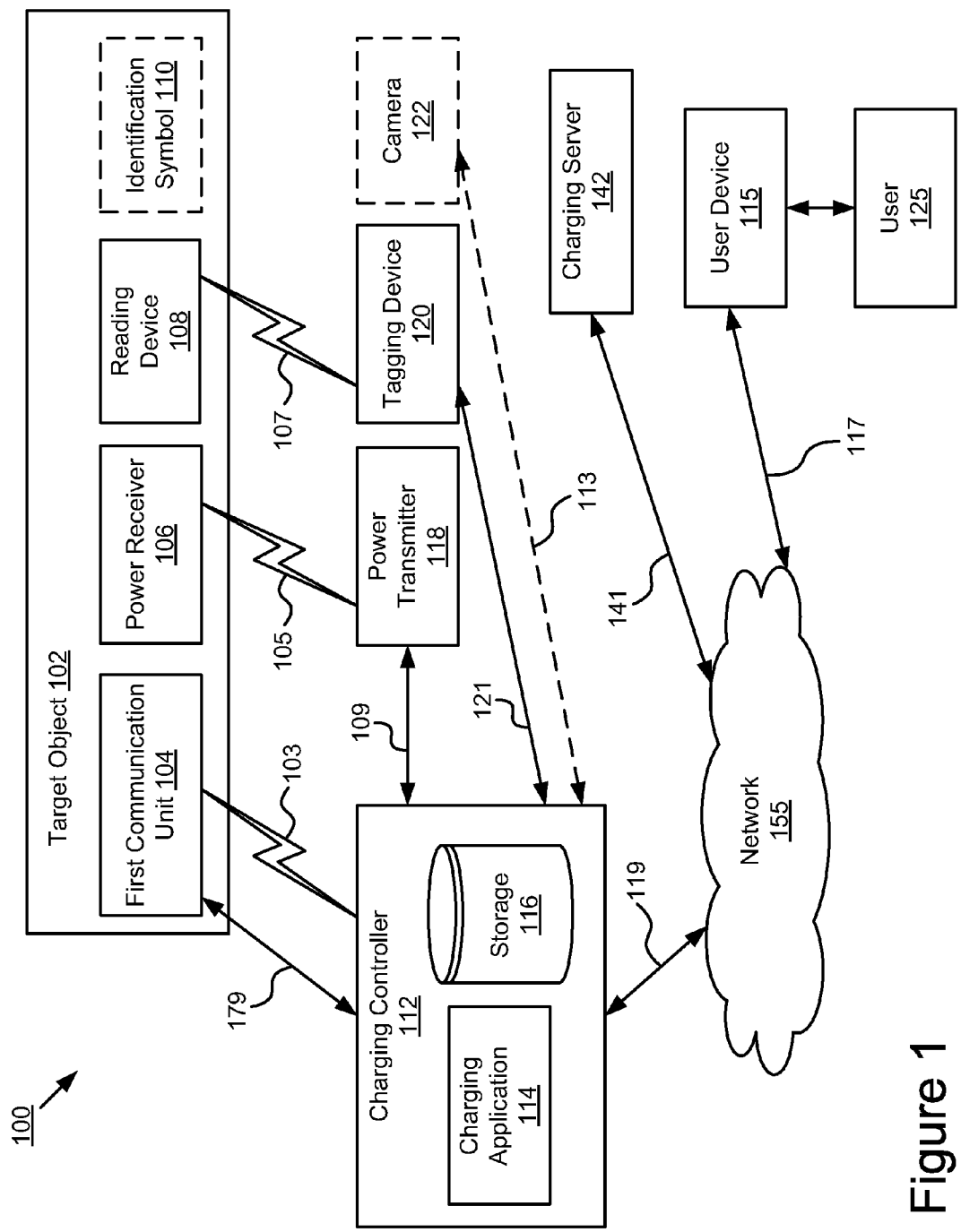
FIG. 1 is a block diagram illustrating an example system for charging a target object wirelessly.

FIG. 1 illustrates a block diagram of some implementations of a system 100 for charging a target object 102 wirelessly. The illustrated system 100 includes a user device 115 that can be accessed by a user 125, a charging server 142, a charging controller 112, a target object 102, a power transmitter 118 and a tagging device 120. Optionally, the system 100 includes a camera 122. The system 100 may include any other components associated with a charging system (e.g., a billing server).

In the illustrated implementation, the charging controller 112 is communicatively coupled to the power transmitter 118 via signal line 109. The charging controller 112 is communicatively coupled to the tagging device 120 via signal line 121. Optionally, the charging controller 112 is communicatively coupled to the optional camera 122 via signal line 113. The charging controller 112 and the target object 102 communicate with each other via a wireless communication link 103 or signal line 179. In the illustrated implementation, the charging controller 112, the charging server 142 and the user device 115 are communicatively coupled via a network 155. For example, the charging controller 112 is communicatively coupled to the network 155 via signal line 119. The charging server 142 is communicatively coupled to the network 155 via signal line 141. The user device 115 is communicatively coupled to the network 155 via signal line 117.

The target object 102 can be any device that has a chargeable battery. Example target objects 102 include, but are not limited to, an electric vehicle, a hybrid electric vehicle, a robot with a chargeable battery and any other device configured to be chargeable with power. While FIG. 1 includes one target object 102, the system 100 may include one or more target objects 102. In the illustrated embodiment, the target object 102 includes a first communication unit 104, a power receiver 106 and a reading device 108. The target object 102 may include other components not shown in FIG. 1, for example, a chargeable battery, a display device for displaying remaining power capacity in the battery, etc. Optionally, the target object 102 includes an identification symbol 110. An identification symbol 110 is a unique identifiable symbol. For example, an identification symbol 110 is one of a serial number, a bar code, a quick response (QR) code, etc.

The first communication unit 104 transmits data from the target object 102 to the charging controller 112 and/or receives data from the charging controller 112. In some implementations, the first communication unit 104 includes a port for direct physical connection to the network 155 or to another communication channel. For example, the first communication unit 104 includes a USB, SD, CAT-5 or similar port for wired communication with the user device 115. In some implementations, the first communication unit 104 includes a wireless transceiver for exchanging data with the user device 115 or other communication channels using one or more wireless communication methods, including IEEE 802.11, IEEE 802.16, BLUETOOTH®, dedicated short-range communications (DSRC) or another suitable wireless communication method. For example, the first communication unit 104 communicates with the charging controller 112 via a wireless communication link 103 using one or more wireless communication methods (e.g., IEEE 802.11, IEEE 802.16, BLUETOOTH®, DSRC, etc.).

In some implementations, the first communication unit 104 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the first communication unit 104 includes a wired port and a wireless transceiver. The first communication unit 104 also provides other conventional connections to the network 155 for distribution of files and/or media objects using standard network protocols including TCP/IP, HTTP, HTTPS and SMTP, etc.

The power receiver 106 can be any device that receives power from a power source. For example, the power receiver 106 is a device that receives power wirelessly from the power transmitter 118 and stores the received power in a battery (not shown). In the illustrated embodiment, the power receiver 106 receives power from the power transmitter 118 via a wireless link 105. For example, the power transmitter 118 transmits power wirelessly to the power receiver 106.

The reading device 108 can be any device that reads data from other devices. For example, the reading device 108 is one of a radio frequency identification (RFID) reader and a near filed communication (NFC) reader. The reading device 108 reads data from the tagging device 120 via a wireless communication link 107.

The power transmitter 118 can be any device that transmits power. For example, the power transmitter 118 is a device that transmits power to the power receiver 106 wirelessly. In one embodiment, if a charging distance between the power transmitter 118 and the power receiver 106 satisfies a safe charging distance (e.g., the charging distance≤the safe charging distance), the power transmitter 118 is configured to transmit power to the power receiver 106 wirelessly. The charging distance satisfying the safe charging distance indicates that the power receiver 106 is in close proximity to the power transmitter 118. However, if the charging distance does not satisfy the safe charging distance (e.g., the charging distance>the safe charging distance), the power transmitter 118 is not allowed to transmit power to the power receiver 106 wirelessly.

A charging distance is a distance between the power transmitter 118 and the power receiver 106. A safe charging distance is a maximal charging distance within which the power transmitter 118 is capable of transmitting power safely and wirelessly to the power receiver 106. In some examples, the safe charging distance has a value between 0.1 millimeter and 20 meters. In other examples, the safe charging distance may have a value less than 0.1 millimeter or a value greater than 20 meters.

The tagging device 120 can be any device that stores data to be read by a reading device 108. For example, the tagging device 120 is one of a RFID tag and an NFC tag. In one embodiment, the tagging device 120 stores a code that is only known to the charging controller 112 and the tagging device 120. In other words, the code is secret data only shared between the charging controller 112 and the tagging device 120. In one embodiment, the code is a verification code. A verification code is data used to verify a target object 102. For example, a verification code is a unique number, a unique symbol or a unique message, etc. Other example verification codes are possible.

In one embodiment, the reading device 108 is configured to read the code from the tagging device 120 if a reading distance between the reading device 108 and the tagging device 120 satisfies a reading threshold (e.g., the reading distance≤the reading threshold). A reading distance is a distance between the reading device 108 and the tagging device 120. A reading threshold is a maximal reading distance within which the reading device 108 is capable of reading a code from the tagging device 120 correctly. For example, if the reading distance is less than or equal to the reading threshold, the reading device 108 is capable of reading the code correctly from the tagging device 120. However, if the reading distance is greater than the reading threshold, the reading device 108 fails to read the code correctly from the tagging device 120.

In one embodiment, the reading device 108 is a RFID reader and the tagging device 120 is a RFID tag. The RFID reader is capable of reading the code from the RFID tag successfully if the reading distance is less than or equal to a reading threshold. In another embodiment, the reading device 108 is a NFC reader and the tagging device 120 is a NFC tag. The NFC reader is capable of reading the code from the NFC tag successfully if the reading distance is less than or equal to a reading threshold.

In one embodiment, the reading threshold is configured by a user. In another embodiment, the reading threshold is configured by the reading device 108 and/or the tagging device 120. For example, the reading threshold is configured by the RFID reader and the RFID tag. In another example, the reading threshold is configured by the NFC reader and the NFC tag. In some examples, the reading threshold has a value between 0.1 millimeter and 20 meters. In other examples, the reading threshold may have a value less than 0.1 millimeter or a value greater than 20 meters.

In one embodiment, the reading device 108 is configured to be positioned within a first distance from the power receiver 106, and the tagging device 120 is configured to be positioned within a second distance from the power transmitter 118. For example, the reading device 108 is placed adjacent to the power receiver 106, and the tagging device 120 is placed adjacent to the power transmitter 118. In another example, the reading device 120 is attached to or mounted on the power receiver 106, and the tagging device 120 is attached to or mounted on the power transmitter 118.

In some embodiments, (1) the placement of the reading device 108 in close proximity to the power receiver 106, (2) the placement of the tagging device 120 in close proximity to the power transmitter 118, (3) the value for the reading threshold and (4) the value for the safe charging distance can be configured in a way that when the reading distance satisfies the reading threshold, the charging distance also satisfies the safe charging distance. In other words, when the reading device 108 can read the code from the tagging device 120 successfully which indicates (1) the reading device 108 is in close proximity to the tagging device 120 and (2) the power receiver 106 is in close proximity to the power transmitter 118, the power transmitter 118 can transmit power wirelessly to the power receiver 106.

For example, assume the reading device 108 is mounted on the power receiver 106 and the tagging device 120 is mounted on the power transmitter 118, so that the reading distance between the reading device 108 and the tagging device 120 is equal to the charging distance between the power receiver 106 and the power transmitter 118. Assume the safe charging distance is configured to be greater than the reading threshold. If the reading distance satisfies the reading threshold, the charging distance also satisfies the safe charging distance, which can be expressed in the following expressions:
because:

$$\text{the reading distance} = \text{the charging distance}; \quad (1)$$

$$\text{the reading distance} \leq \text{the reading threshold; and} \quad (2)$$

$$\text{the reading threshold} \leq \text{the safe charging distance}; \quad (3)$$

thus:

$$\text{the charging distance} \leq \text{the safe charging distance}.$$

The optional camera 122 can be an optical device for recording images. For example, the camera 122 records an image that depicts the identification symbol 110 and sends image data describing the image to the charging controller 112. In one embodiment, the camera 122 is positioned within a first distance from the power transmitter 118, and the identification symbol 110 is positioned within a second distance from the power receiver 106. For example, the identification symbol 110 is attached to or mounted on the power receiver 106, and the camera 122 is attached to or mounted on the power transmitter 118. In the examples, (1) the placement of the camera 122 close by the power transmitter 118, (2) the placement of the identification symbol 110 close by the power receiver 106 and (3) the value for the safe charging distance can be configured in a way that when the camera 122 can capture the identification symbol 110 successfully in an image, the charging distance satisfies the safe charging distance. For example, when the camera 122 is capable of capturing the identification symbol 110 in an image which indicates (1) the camera 122 is close by the identification symbol 110 and (2) the power transmitter 118 is close by the power receiver 106, the power transmitter 118 can charge the target object 102 wirelessly.

The charging controller 112 can be any device that manages the charging of a target object 102. For example, the charging controller 112 is a computing device that includes a memory (not shown) and a processor (not shown). While FIG. 1 includes one charging controller 112, in practice one or more charging controllers 112 can be included in FIG. 1. In the illustrated embodiment, the charging controller 112 includes a charging application 114 and a storage device 116.

The charging application 114 can be code and routines for controlling the charging of a target object 102. In some implementations, the charging application 114 can be implemented using hardware including a field-programmable gate array (FPGA) or an application-specific integrated circuit (ASIC). In some other implementations, the charging application 114 can be implemented using a combination of hardware and software. In some implementations, the charging application 114 may be stored in a combination of the devices and servers, or in one of the devices or servers. The charging application 114 is described below in more detail with reference to FIGS. 2-5.

The storage device 116 can be a non-transitory memory that stores data for providing the functionality described herein. The storage device 116 may be a dynamic random access memory (DRAM) device, a static random access memory (SRAM) device, flash memory or some other memory devices. In some implementations, the storage device 116 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 116 is described below in more detail with reference to FIG. 2.

The charging server 142 can be a hardware server that includes a processor, a memory and network communication capabilities. The charging server 142 sends and receives data to and from other entities of the system 100 via the network 155. While FIG. 1 includes one charging server 142, the system 100 may include one or more charging servers 142.

The user device 115 can be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 155. In the illustrated implementation, the user 125 interacts with the user device 115. While FIG. 1 illustrates one user device 115, the present disclosure applies to a system architecture having one or more user devices 115.

The network 155 can be a conventional type, wired or wireless, and may have numerous different configurations including a star configuration, token ring configuration or other configurations. Furthermore, the network 155 may include a local area network (LAN), a wide area network (WAN) (e.g., the Internet), and/or other interconnected data paths across which multiple devices may communicate. In some implementations, the network 155 may be a peer-to-peer network. The network 155 may also be coupled to or includes portions of a telecommunications network for sending data in a variety of different communication protocols. In some implementations, the network 155 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 155 coupled to the user device 115, the charging server 142 and the charging controller 112, in practice one or more networks 155 can be connected to these entities.

Charging Application

Figure 2:
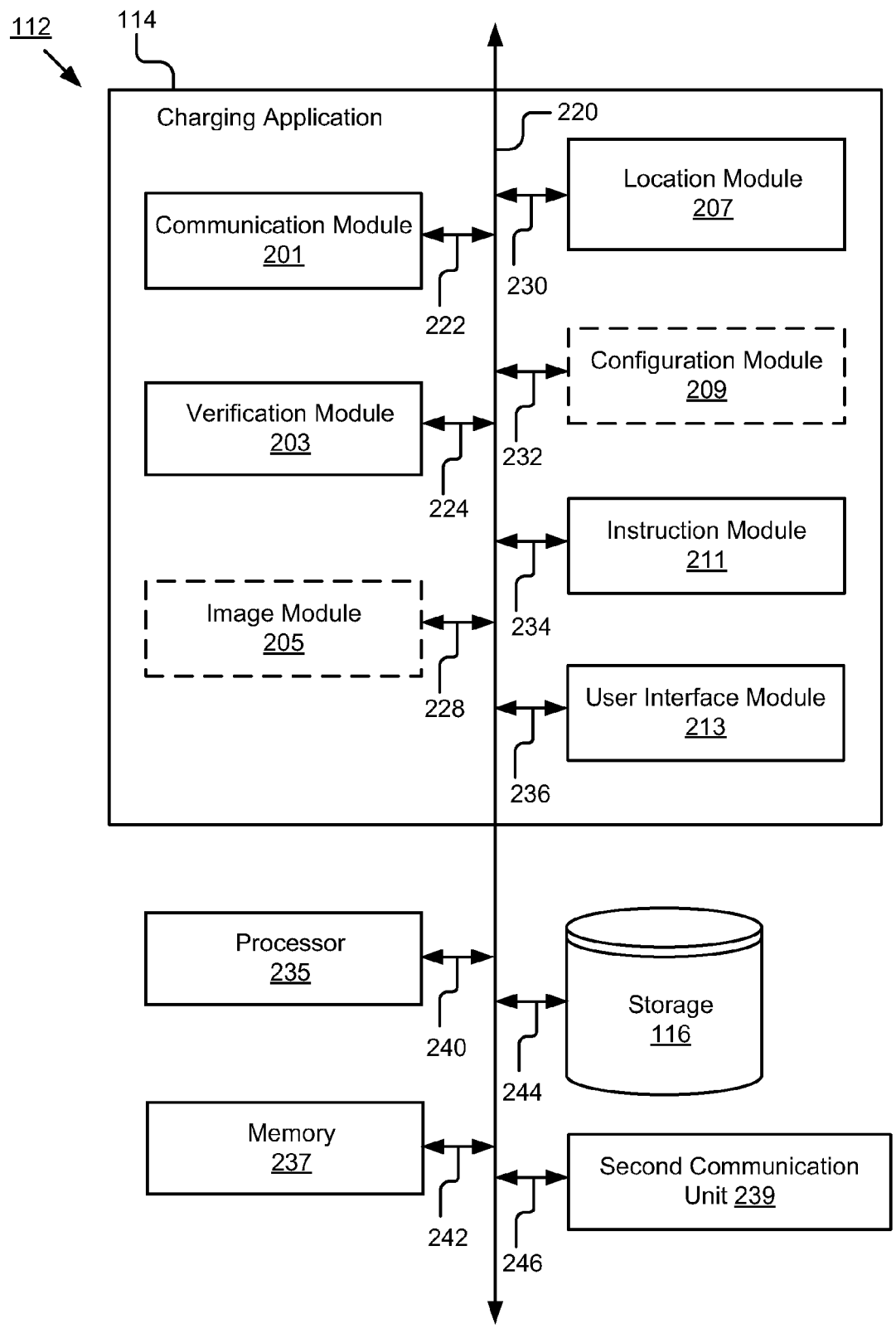
FIG. 2 is a block diagram illustrating an example of a charging application.

Referring now to FIG. 2, an example of the charging application 114 is shown in more detail. FIG. 2 is a block diagram of a charging controller 112 that includes a charging application 114, a processor 235, a memory 237, a second communication unit 239 and a storage device 116 according to some examples. The components of the charging controller 112 are communicatively coupled by a bus 220.

The processor 235 includes an arithmetic logic unit, a microprocessor, a general purpose controller or some other processor array to perform computations and provide electronic display signals to a display device. The processor 235 is coupled to the bus 220 for communication with the other components via signal line 240. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The memory 237 is coupled to the bus 220 for communication with the other components via signal line 242. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The second communication unit 239 transmits data from the charging controller 112 to one or more of the target object 102, the charging server 142, the user device 115, the power transmitter 118, the tagging device 120 and/or the optional camera 122. The second communication unit 239 also receives data from one or more of the target object 102, the charging server 142, the user device 115, the power transmitter 118, the tagging device 120 and/or the camera 122. The second communication unit 239 is coupled to the bus 220 via signal line 246. In some embodiments, the second communication unit 239 has a similar structure and provides similar functionality as those described above for the first communication unit 104, and the description will not be repeated here.

In the illustrated implementation, the storage device 116 is communicatively coupled to the bus 220 via signal line 244. In some implementations, the storage device 116 stores one or more of: verification data describing a verification code shared between the charging controller 112 and the target object 102; data describing a safe charging range; data describing a safe charging distance; data describing a charging profile; and data describing one or more identification symbols 110. The data stored in the storage device 116 is described below in more detail. In some implementations, the storage device 116 may store other data for providing the functionality described herein.

In the illustrated implementation shown in FIG. 2, the charging application 114 includes a communication module 201, a verification module 203, an optional image module 205, a location module 207, an optional configuration module 209, an instruction module 211 and a user interface module 213. These components of the charging application 114 are communicatively coupled to each other via the bus 220.

The communication module 201 can be software including routines for handling communications between the charging application 114 and other components of the charging controller 112. In some implementations, the communication module 201 can be a set of instructions executable by the processor 235 to provide the functionality described below for handling communications between the charging application 114 and other components of the charging controller 112. In some implementations, the communication module 201 can be stored in the memory 237 of the charging controller 112 and can be accessible and executable by the processor 235. The communication module 201 may be adapted for cooperation and communication with the processor 235 and other components of the charging controller 112 via signal line 222.

The communication module 201 sends and receives data, via the second communication unit 239, to and from one or more of the user device 115, the target object 102, the charging server 142, the power transmitter 118, the camera 122 and the tagging device 120. For example, the communication module 201 receives, via the second communication unit 239, data describing a charging profile inputted by a user from a user device 115 and sends the data to the configuration module 209. In another example, the communication module 201 receives graphical data for providing a user interface to a user from the user interface module 213 and sends the graphical data to a user device 115, causing the user device 115 to present the user interface to the user.

In some implementations, the communication module 201 receives data from other components of the charging application 114 and stores the data in the storage device 116. For example, the communication module 201 receives graphical data from the user interface module 213 and stores the graphical data in the storage device 116. In some implementations, the communication module 201 retrieves data from the storage device 116 and sends the retrieved data to other components of the charging application 114. For example, the communication module 201 retrieves verification data describing a verification code from the storage 116 and sends the data to the verification module 203.

The verification module 203 can be software including routines for verifying a code. In some implementations, the verification module 203 can be a set of instructions executable by the processor 235 to provide the functionality described below for verifying a code. In some implementations, the verification module 203 can be stored in the memory 237 of the charging controller 112 and can be accessible and executable by the processor 235. The verification module 203 may be adapted for cooperation and communication with the processor 235 and other components of the charging controller 112 via signal line 224.

In one embodiment, the reading device 108 included in the target object 102 reads a code (e.g., a verification code) from the tagging device 120. For example, the target object 102 generates a charging request to charge a battery associated with the target object 102. Responsive to the charging request, the reading device 108 generates a reading request to read the code from the tagging device 120, and sends the reading request to the tagging device 120. The tagging device 120 retrieves the code from an associated storage device (not shown) and sends the code to the reading device 108. In one embodiment, the reading device 108 is configured to be capable of reading the code correctly from the tagging device 120 only if the reading distance between the reading device 108 and the tagging device 120 satisfies a reading threshold (e.g., the reading distance≤the reading threshold). The reading device 108 fails to read the code from the tagging device 120 if the reading distance does not satisfy the reading threshold (e.g., the reading distance>the reading threshold). In another embodiment, the reading device 108 is automatically activated to read the code from the tagging device 120 if the tagging device 120 is present within a distance satisfying the reading threshold. For example, the reading device 108 detects presence of the tagging device 120 located within the reading threshold and automatically reads the code from the tagging device 120 responsive to the presence of the tagging device 120. The reading device 108 sends the code to the verification module 203 via the first communication unit 104, the second communication unit 239 and the communication module 201.

The verification module 203 receives the code from the reading device 108 and verifies the code. For example, the verification module 203 retrieves verification data shared between the tagging device 120 and the charging controller 112 from the storage device 116, and determines whether the code is valid based on the retrieved verification data. For example, the code is a secret code shared between the charging controller 112 and the tagging device 120, and the verification module 203 determines whether the received code matches the secret code stored in the storage 116. If the code matches the secret code, the verification module 203 confirms the verification of the code and sends a verification signal to the location module 207. The verification of the code indicates: (1) the reading device 108 is close by the tagging device 120 and the power transmitter 118 is close by the power receiver 106; (2) the reading distance between the reading device 108 and the tagging device 120 satisfies a reading threshold; and (3) the charging distance between the power transmitter 118 and the power receiver 106 of the target object 102 satisfies the safe charging distance.

If the verification of the code fails, the verification module 203 optionally instructs the user interface module 213 to generate graphical data for providing a user interface that notifies the user to adjust one or more of a location of the target object 102, a location of the power transmitter 118 and a location of the power receiver 106.

The image module 205 can be software including routines for processing an image. In some implementations, the image module 205 can be a set of instructions executable by the processor 235 to provide the functionality described below for processing an image. In some implementations, the image module 205 can be stored in the memory 237 of the charging controller 112 and can be accessible and executable by the processor 235. The image module 205 may be adapted for cooperation and communication with the processor 235 and other components of the charging controller 112 via signal line 228.

In one embodiment, the image module 205 receives image data describing an image captured by the camera 122. The image module 205 processes the image and determines whether the identification symbol 110 is captured correctly in the image. For example, the image module 205 applies image processing techniques to determine whether the identification symbol 110 is captured correctly in the image. If the identification symbol 110 is captured in the image, the image module 205 sends a symbol-captured signal to the location module 207. The capture of the identification symbol 110 by the camera 122 indicates: (1) the camera 122 is close by the identification symbol 110 and the power transmitter 118 is close by the power receiver 106; and (2) the charging distance between the power transmitter 118 and the power receiver 106 of the target object 102 satisfies the safe charging distance.

The location module 207 can be software including routines for determining a location associated with the target object 102. In some implementations, the location module 207 can be a set of instructions executable by the processor 235 to provide the functionality described below for determining a location associated with the target object 102. In some implementations, the location module 207 can be stored in the memory 237 of the charging controller 112 and can be accessible and executable by the processor 235. The location module 207 may be adapted for cooperation and communication with the processor 235 and other components of the charging controller 112 via signal line 230.

In one embodiment, the location module 207 receives a verification signal from the verification module 205, indicating the verification of the code is successful. The successful verification of the code indicates a charging distance between the power transmitter 118 and the power receiver 106 satisfies a safe charging distance (e.g., the charging distance≤the safe charging distance). Responsive to the verification signal, the location module 207 determines that the location of the target object 102 satisfies a safe charging range. For example, the location module 207 determines that the location of the target object 102 is within a safe charging range. The location module 207 sends a location-verification signal to the instruction module 211, causing the instruction module 211 to instruct the power transmitter 118 to transmit power wirelessly to the power receiver 106. The location-verification signal indicates the location of the target object 102 is verified to be within the safe charging range.

Figure 7:
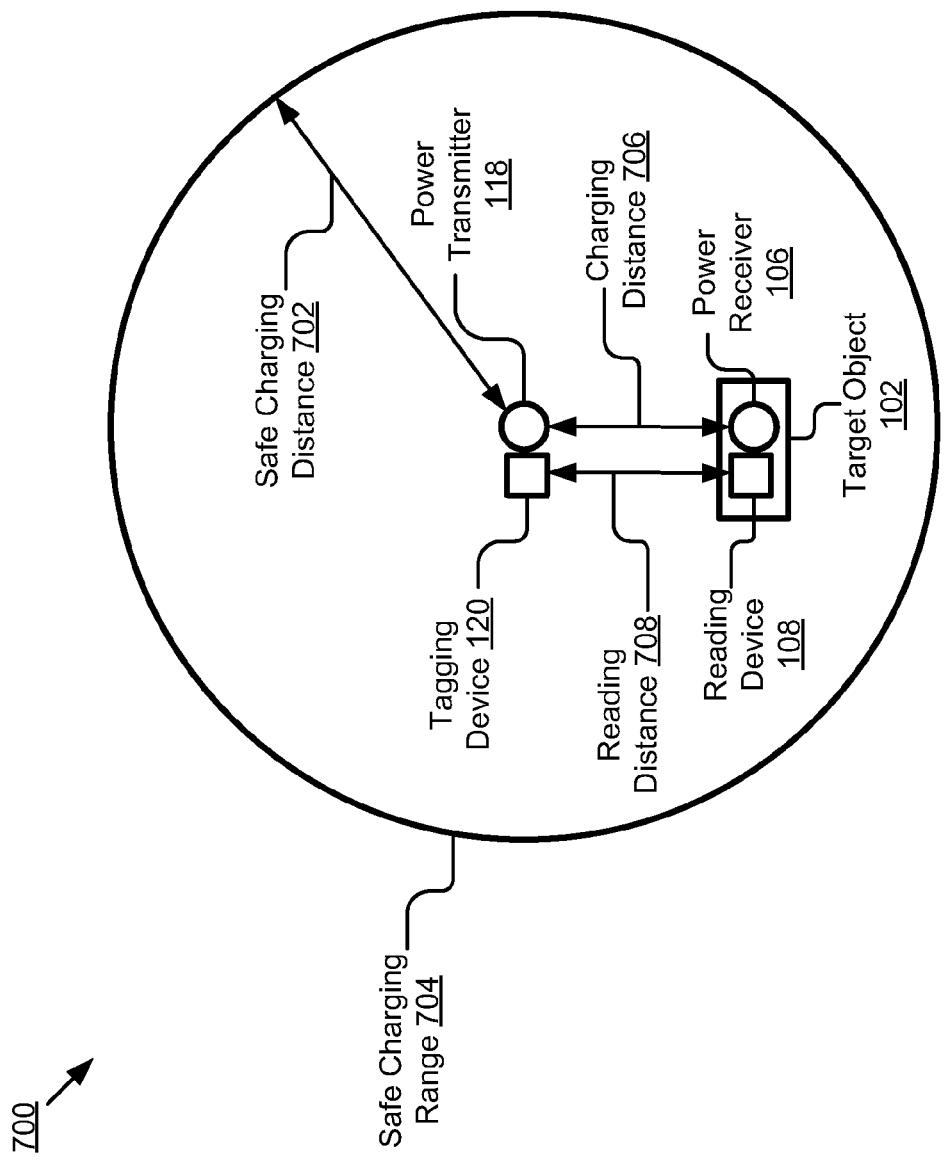
FIG. 7 is a graphic representation illustrating an example safe charging range and an example safe charging distance.

A safe charging range is a maximal charging range within which the target object 102 is positioned and configured to be charged wirelessly by the power transmitter 118. For example, if the location of the target object 102 is within the safe charging range, the target object 102 can be charged wirelessly by the power transmitter 118. However, if the target object 102 is outside the safe charging range, the target object 102 cannot be charged wirelessly by the power transmitter 118. In one embodiment, the safe charging range is determined based on the safe charging distance. An example safe charging range is illustrated in FIG. 7.

In one embodiment, the location module 207 receives a symbol-captured signal from the image module 205, indicating the identification symbol 110 is captured in the image. The location module 207 determines the location of the target object 102 is within a safe charging range responsive to the symbol-captured signal. The location module 207 sends a location-verification signal to the instruction module 211, causing the instruction module 211 to instruct the power transmitter 118 to transmit power wirelessly to the power receiver 106.

The configuration module 209 can be software including routines for configuring the charging of the target object 102. In some implementations, the configuration module 209 can be a set of instructions executable by the processor 235 to provide the functionality described below for configuring the charging of the target object 102. In some implementations, the configuration module 209 can be stored in the memory 237 of the charging controller 112 and can be accessible and executable by the processor 235. The configuration module 209 may be adapted for cooperation and communication with the processor 235 and other components of the charging controller 112 via signal line 232.

In one embodiment, the configuration module 209 configures a safe charging distance and a safe charging range for the target object 102. For example, the configuration module 209 receives input data from a user and configures the safe charging distance and the safe charging range based on the input data. In another example, the configuration module 209 configures the safe charging distance and the safe charging range based on one or more safety parameters describing instructions on how to configure a wireless charging system.

In some implementations, the configuration module 209 configures the safe charging distance and/or the safe charging range based on a communication range of the reading device 108 and the tagging device 120. The communication range of the reading device 108 and the tagging device 120 can be a range within which the reading device 108 is capable of reading a code from the tagging device 120 correctly. The communication range can be determined based on the reading threshold. For example, if the reading device 108 is a RFID reader and the tagging device is a RFID tag, the configuration module 209 configures the safe charging distance and the safe charging range based on a communication range of the RFID reader and the RFID tag. In another example, if the reading device 108 is a NFC reader and the tagging device is a NFC tag, the configuration module 209 configures the safe charging distance and the safe charging range based on a communication range of the NFC reader and the NFC tag.

In one embodiment, the configuration module 209 configures a charging profile for the target object 102. A charging profile is data indicating a charging configuration for the target object 102. For example, a charging profile includes a charging start time to begin charging the target object 102, a target power level to achieve in the charging process (e.g., 90% full of the battery, 100% full of the battery, etc.) and one or more user preferences (e.g., to charge the target object 102 eco-friendly, to charge the target object 102 when the power rate is below a predetermined rate, etc.). The charging profile may include other data for controlling the charging of the target object 102. In one embodiment, the configuration module 209 receives input data from a user and configures the charging profile based on the input data. For example, if the user inputs data indicating to charge the target object 102 when the power rate is below a predetermined rate after midnight, the configuration module 209 generates a charging profile describing the charging preference specified by the user.

In one embodiment, the configuration module 209 configures (1) the placement of the reading device 108 in close proximity to the power receiver 106, (2) the placement of the tagging device 120 in close proximity to the power transmitter 118, (3) the value for the reading threshold and (4) the value for the safe charging distance in a way that when the reading distance satisfies the reading threshold (e.g., the reading device 108 can read the code from the tagging device 120 successfully), the charging distance also satisfies the safe charging distance (e.g., the power transmitter 118 can charge the target object 102 wirelessly).

In another embodiment, the configuration module 209 configures (1) the placement of the camera in close proximity to the power transmitter 118, (2) the placement of the identification symbol 110 in close proximity to the power receiver 106 and (3) the value for the safe charging distance in a way that when the camera 122 can capture the identification symbol 110 successfully in an image, the charging distance satisfies the safe charging distance (e.g., the power transmitter 118 can charge the target object 102 wirelessly).

The instruction module 211 can be software including routines for instructing the power transmitter 118 to charge the target object 102. In some implementations, the instruction module 211 can be a set of instructions executable by the processor 235 to provide the functionality described below for instructing the power transmitter 118 to charge the target object 102. In some implementations, the instruction module 211 can be stored in the memory 237 of the charging controller 112 and can be accessible and executable by the processor 235. The instruction module 211 may be adapted for cooperation and communication with the processor 235 and other components of the charging controller 112 via signal line 234.

In one embodiment, the instruction module 211 receives a location-verification signal from the location module 207, indicating the location associated with the target object 102 satisfies a safe charging range. The instruction module 211 instructs the power transmitter 118 to start transmitting power to the power receiver 106 wirelessly. In some implementations, the instruction module 211 also receives a charging profile from the configuration module 209 and instructs the power transmitter 118 to transmit power to the power receiver 106 according to the charging profile. For example, the instruction module 211 instructs the power transmitter 118 to transmit power to the power receiver 106 at the charging start time specified by the charging profile. In another example, if the charging profile indicates to charge the target object 102 when the power rate is below a predetermined rate after midnight, the instruction module 211 instructs the power transmitter 118 to start transmitting power to the power receiver 106 when the power rate is below the predetermined rate after midnight.

In another embodiment, the instruction module 211 instructs the user interface module 213 to generate graphical data for providing a user interface that depicts a charging progress (e.g., 50% full of battery, 1-hour remaining charging time, etc.) to the user.

The user interface module 213 can be software including routines for generating graphical data for providing user interfaces to users. In some implementations, the user interface module 213 can be a set of instructions executable by the processor 235 to provide the functionality described below for generating graphical data for providing user interfaces to users. In some implementations, the user interface module 213 can be stored in the memory 237 of the charging controller 112 and can be accessible and executable by the processor 235. The user interface module 213 may be adapted for cooperation and communication with the processor 235 and other components of the charging controller 112 via signal line 236.

In some implementations, the user interface module 213 generates graphical data for providing a user interface that present a charging profile to a user. The user interface module 213 sends the graphical data to a user device 115, causing the user device 115 to present the user interface to the user. The user can modify the charging profile via the user interface. In some implementations, the user interface module 213 generates graphical data for providing a user interface that presents a charging progress to the user. The user interface module 213 may generate graphical data for providing other user interfaces to users.

Methods

Figure 3:
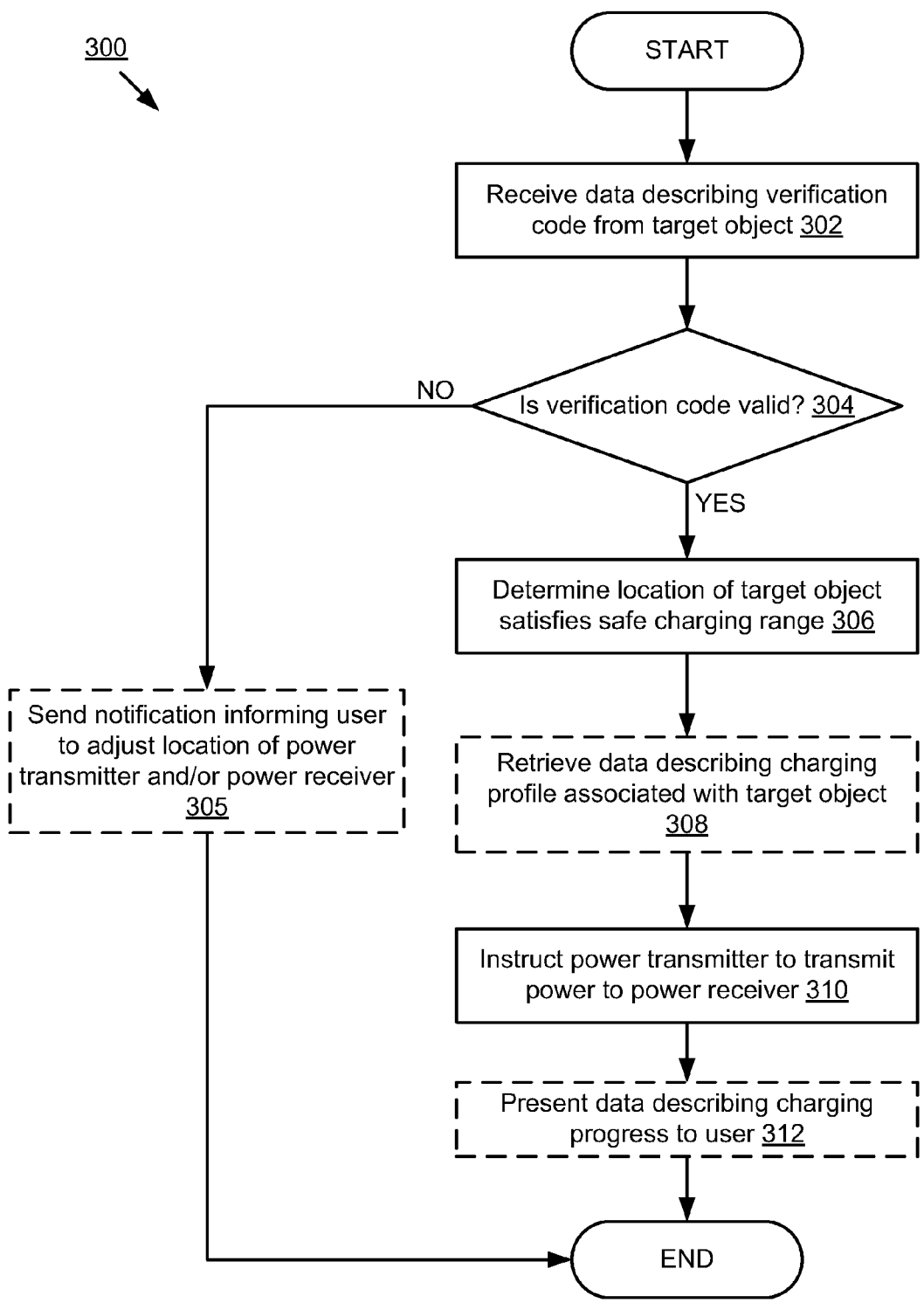
FIG. 3 is a flowchart of an example method for charging a target object wirelessly.

FIG. 3 is a flowchart of an example method 300 for charging a target object 102 wirelessly. In some implementations, the communication module 201 receives 302 data describing a verification code from the target object 102. The verification module 203 determines 304 whether the verification code is valid. If the verification code is valid, the method 300 moves to step 306. Otherwise, the method 300 moves to step 305. At step 305, the method 300 optionally sends a notification to a user device 115, informing a user associated with the target object 102 to adjust one or more of a location of the target object 102, a location of the power transmitter 118 and a location of the power receiver 106.

At step 306, the location module 207 determines that a location of the target object 102 satisfies a safe charging range. Optionally, the communication module 201 retrieves 308 data describing a charging profile associated with the target object 102. The instruction module 211 instructs 310 the power transmitter 118 to transmit power to the power receiver 106. For example, the instruction module 211 instructs the power transmitter 118 to transmit power to the power receiver 106 according to the charging profile. Optionally, the user interface module 213 generates graphical data for presenting 312 data describing a charging progress of the target object 102 to the user via a user interface.

Figure 4:
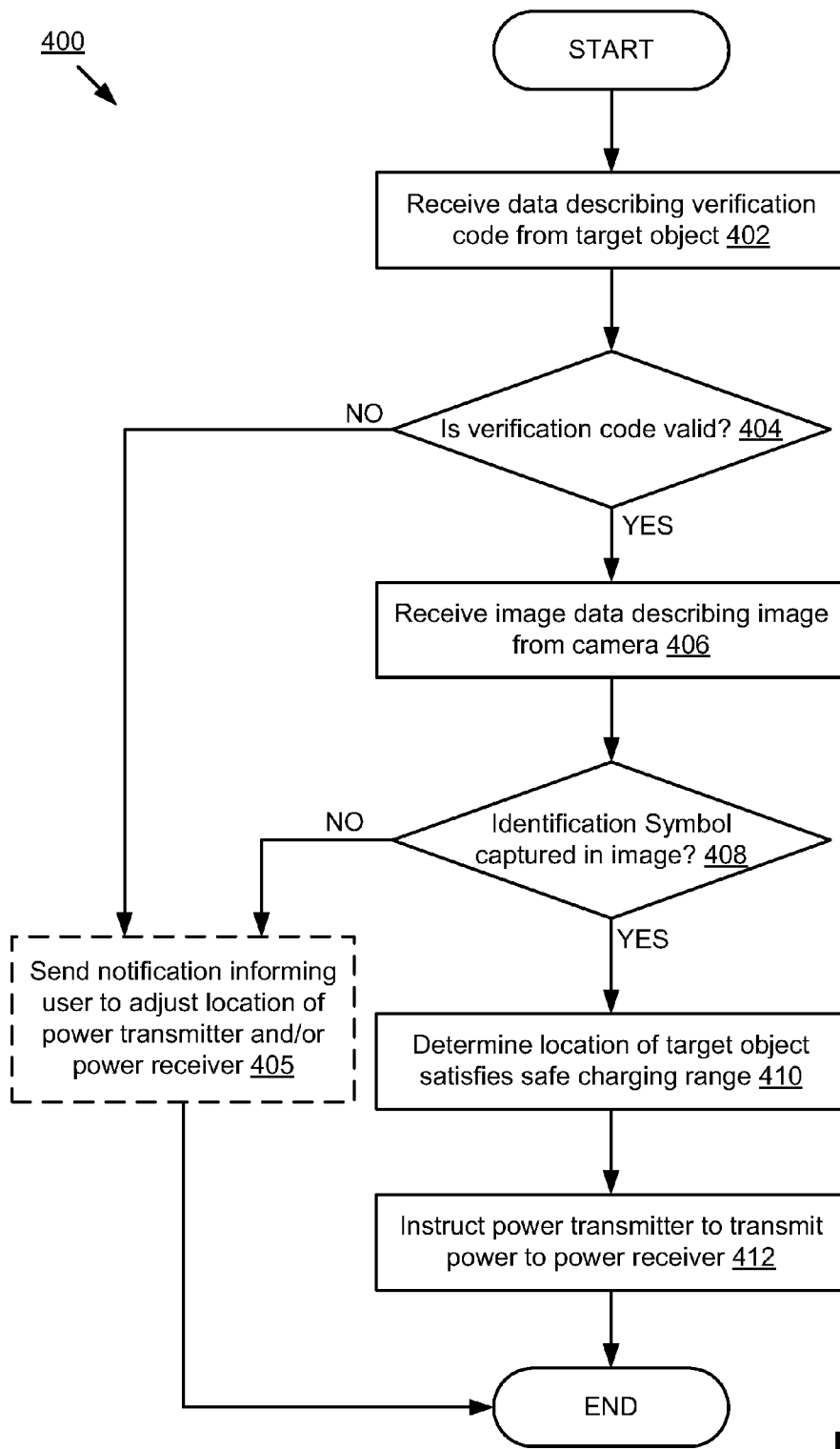
FIG. 4 is a flowchart of another example method for charging a target object wirelessly.

FIG. 4 is a flowchart of another example method 400 for charging a target object 102 wirelessly. In some implementations, the communication module 201 receives 402 data describing a verification code from the target object 102. The verification module 203 determines 404 whether the verification code is valid. If the verification code is valid, the method 400 moves to step 406. Otherwise, the method 400 moves to step 405. At step 405, the method 400 optionally sends a notification to a user device 115, informing a user associated with the target object 102 to adjust one or more of a location of the target object 102, a location of the power transmitter 118 and a location of the power receiver 106.

At step 406, the communication module 201 receives image data describing an image captured by the camera 122. The image module 205 determines 408 whether the identification symbol 110 is captured in the image. If the image is captured, the method 400 moves to step 410. Otherwise, the method 400 moves to step 405. At step 410, the location module 207 determines that a location of the target object 102 satisfies a safe charging range. The instruction module 211 instructs 412 the power transmitter 118 to transmit power to the power receiver 106.

Event Diagram

Figure 5:
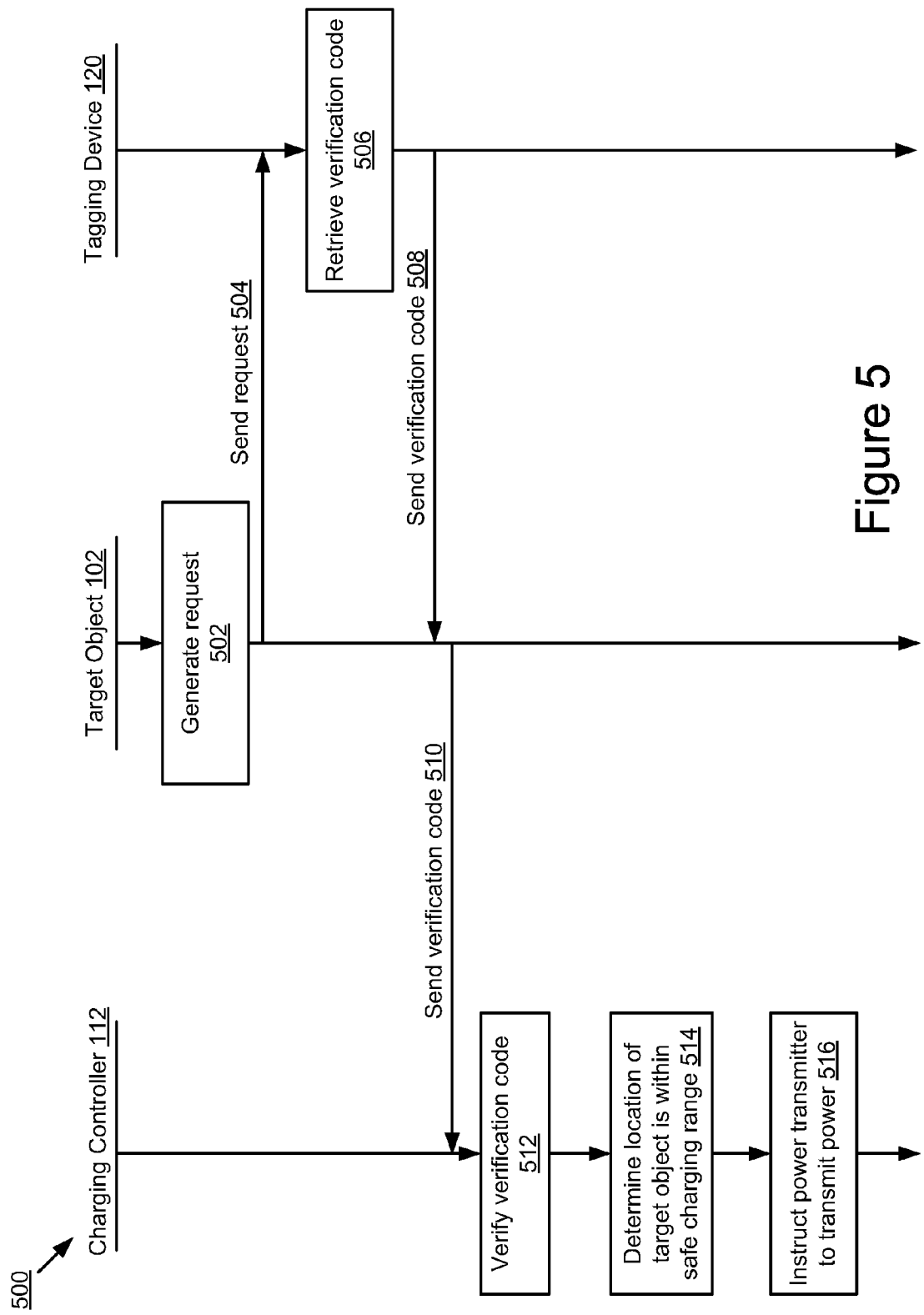
FIG. 5 is an event diagram illustrating an example process for charging a target object wirelessly.

FIG. 5 is an event diagram illustrating an example process 500 for charging a target object 102 wirelessly. The target object 102 generates 502 a request and sends 504 the request to the tagging device 120. The tagging device 120 retrieves 506 a verification code from a storage device (not shown) associated with the tagging device 120, and sends 508 the verification code to the target object 102. The target object 102 sends 510 the verification code to the charging controller 112. The charging controller 112 verifies 512 the verification code. Responsive to the successful verification of the code, the charging controller 112 determines 514 a location of the target object 102 is within the safe charging range. The charging controller 112 instructs 516 the power transmitter 118 to transmit power to the power receiver 106.

Graphic Representations

Figure 6:
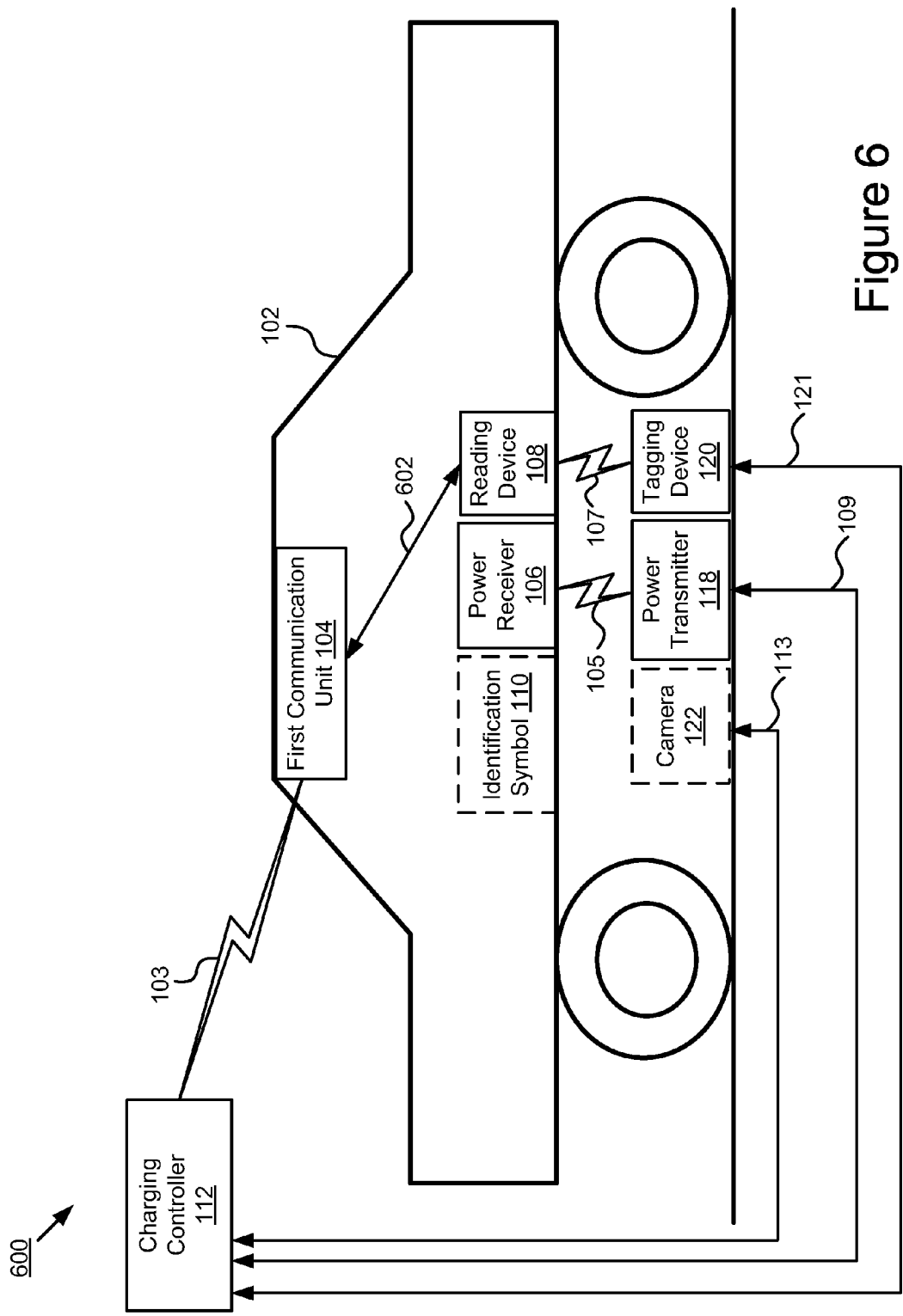
FIG. 6 is a graphic representation illustrating an example wireless charging system.

FIG. 6 is a graphic representation 600 illustrating an example wireless charging system. In the illustrated embodiment, the target object 102 is a vehicle. The power transmitter 118 is positioned right below the power receiver 106 and the tagging device 120 is positioned right below the reading device 108. The reading device 108 is placed close by the power receiver 106 and the tagging device 120 is placed close by the power transmitter 118. For example, the reading device 108 is attached to the power receiver 106 and the tagging device 120 is attached to the power transmitter 118. If the reading device 108 is capable of reading the verification code from the tagging device 120 successfully, the charging distance between the power transmitter 118 and the power receiver 106 satisfies the safe charging distance (e.g., the charging distance≤the safe charging distance). The charging distance satisfying the safe charging distance indicates that the power receiver 106 is in close proximity to the power transmitter 118 (e.g., the power receiver 106 being right above the power transmitter 118 as illustrated in FIG. 6). The power transmitter 118 can transmit power safely to the power receiver 106 using a wireless connection.

In the illustrated embodiment, the reading device 108 is communicatively coupled to the first communication unit 104 via signal line 602. The reading device 108 sends the verification code obtained from the tagging device 120 to the charging controller 112 via the first communication unit 104, causing the charging controller 112 to verify the verification code. The charging controller 112 instructs the power transmitter 118 to transmit power to the power receiver 106 using a wireless connection responsive to the verification of the code.

Optionally, the target object 102 includes an identification symbol 110. The identification symbol 110 is placed close by the power receiver 106 and the camera 122 is placed close by the power transmitter 118. For example, the identification symbol 110 is attached to the power receiver 106 and the camera 122 is attached to the power transmitter 118. The camera 122 is positioned right below the identification symbol 110. If the camera 122 is capable of capturing an image that successfully depicts the identification symbol 110, the charging distance between the power transmitter 118 and the power receiver 106 is within the safe charging distance. The power transmitter 118 can transmit power safely to the power receiver 106 using a wireless connection.

FIG. 7 is a graphic representation 700 illustrating an example safe charging range 704 and an example safe charging distance 702. The graphic representation 700 depicts a power transmitter 118, a power receiver 106 and a charging distance 706 between the power transmitter 118 and the power receiver 106. The graphic representation 700 also depicts a tagging device 120 attached to the power transmitter 118, a reading device 108 attached to the power receiver 106 and a reading distance 708 between the reading device 108 and the tagging device 120. The charging distance 706 between the power transmitter 118 and the power receiver 106 satisfies the safe charging distance 702. For example, the charging distance 706 is less than the safe charging distance 702. The location of the target object 102 is located within the safe charging range 704, so that the power transmitter 118 can transmit power wirelessly to the power receiver 106.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
once a reading distance between a reading device positioned adjacent to a power receiver of a target object and a tagging device positioned adjacent to a power transmitter of a charging controller has been satisfied, transmitting a code from the tagging device positioned adjacent to the power transmitter of the charging controller to the reading device positioned adjacent to the power receiver of the target object, the code being stored on the tagging device;
receiving, via a wireless communication unit of the charging controller, a wireless transmission from the reading device of the target object, the wireless transmission including the code that the reading device of the target object received from the tagging device of the charging controller;
verifying the code to verify the target object;
responsive to the code being verified, determining that a charging distance between the power transmitter of the charging station and the power receiver of the target object satisfies a safe charging distance; and
responsive to determining the charging distance between the power transmitter and the power receiver associated with the target object satisfies the safe charging distance, instructing the power transmitter of the charging controller to wirelessly transmit power to the power receiver of the target object.

2. The method of claim 1, wherein the safe charging distance is a maximal range within which the target object is positioned and configured to be charged wirelessly by the power transmitter.

3. The method of claim 1, wherein the reading device is a radio frequency identification reader and the tagging device is a radio frequency identification tag.

4. The method of claim 1, wherein the reading device is a near field communication reader and the tagging device is a near field communication tag.

5. The method of claim 1, wherein the reading device is configured to be positioned within a first distance from the power receiver and the tagging device is configured to be positioned within a second distance from the power transmitter.

6. The method of claim 1, wherein the reading device is attached to the power receiver and the tagging device is attached to the power transmitter.

7. The method of claim 1, wherein verifying the code comprises:
retrieving verification data from a storage device;
determining whether the code matches the verification data; and
confirming a verification of the code responsive to determining that the code matches the verification data.

8. A computer program product comprising a non-transitory computer usable medium including a computer readable program, wherein the computer readable program when executed on a computer causes the computer to:
once a reading distance between a reading device positioned adjacent to a power receiver of a target object and a tagging device positioned adjacent to a power transmitter of a charging controller has been satisfied, transmit a code from the tagging device positioned adjacent to the power transmitter of the charging controller to the reading device positioned adjacent to the power receiver of the target object, the code being stored on the tagging device;
receive, via a wireless communication unit of the charging controller, a wireless transmission from the reading device of the target object, the wireless transmission including the code that the reading device of the target object received from the tagging device of the charging controller;
verify the code to verify the target object;
responsive to the code being verified, determine that a charging distance between the power transmitter of the charging station and the power receiver of the target object satisfies a safe charging distance; and
responsive to determining that the charging distance between the power transmitter and the power receiver associated with the target object satisfies the safe charging distance, instruct the power transmitter of the charging controller to wirelessly transmit power to the power receiver of the target object.

9. The computer program product of claim 8, wherein the safe charging distance is a maximal range within which the target object is positioned and configured to be charged wirelessly by the power transmitter.

10. The computer program product of claim 8, wherein the reading device is a radio frequency identification reader and the tagging device is a radio frequency identification tag.

11. The computer program product of claim 8, wherein the reading device is a near field communication reader and the tagging device is a near field communication tag.

12. The computer program product of claim 8, wherein the reading device is configured to be positioned within a first distance from the power receiver and the tagging device is configured to be positioned within a second distance from the power transmitter.

13. The computer program product of claim 8, wherein the reading device is attached to the power receiver and the tagging device is attached to the power transmitter.

14. The computer program product of claim 8, wherein to verify the code comprises:
retrieving verification data from a storage device;
determining whether the code matches the verification data; and
confirming a verification of the code responsive to determining that the code matches the verification data.

15. A system comprising:
a processor; and
a memory storing instructions that, when executed, cause the system to:
once a reading distance between a reading device positioned adjacent to a power receiver of a target object and a tagging device positioned adjacent to a power transmitter of a charging controller has been satisfied, transmit a code from the tagging device positioned adjacent to the power transmitter of the charging controller to the reading device positioned adjacent to the power receiver of the target object, the code being stored on the tagging device;
receive, via a wireless communication unit of the charging controller, a wireless transmission from the reading device of the target object, the wireless transmission including the code that the reading device of the target object received from the tagging device of the charging controller;
verify the code to verify the target object;
responsive to the code being verified, determine that a charging distance between the power transmitter of the charging station and the power receiver of the target object satisfies a safe charging distance; and responsive to determining the charging distance between the power transmitter and the power receiver associated with the target object satisfies the safe charging distance, instruct the power transmitter of the charging controller to wirelessly transmit power to the power receiver of the target object.

16. The system of claim 15, wherein the safe charging distance is a maximal range within which the target object is positioned and configured to be charged wirelessly by the power transmitter.

17. The system of claim 15, wherein the reading device is a radio frequency identification reader and the tagging device is a radio frequency identification tag.

18. The system of claim 15, wherein the reading device is a near field communication reader and the tagging device is a near field communication tag.

19. The system of claim 15, wherein the reading device is configured to be positioned within a first distance from the power receiver and the tagging device is configured to be positioned within a second distance from the power transmitter.

20. The system of claim 15, wherein the reading device is attached to the power receiver and the tagging device is attached to the power transmitter.

\* \* \* \* \*